UNITED STATES PATENT OFFICE.

CARLETON ELLIS, OF LARCHMONT, NEW YORK, ASSIGNOR TO ELLIS-FOSTER COMPANY, A CORPORATION OF NEW JERSEY.

PRESERVED FOOD PRODUCT.

987,868.   Specification of Letters Patent.   Patented Mar. 28, 1911.

No Drawing.   Application filed January 31, 1908.   Serial No. 413,608.

*To all whom it may concern:*

Be it known that I, CARLETON ELLIS, a citizen of the United States, residing at Larchmont, in the county of Westchester and State of New York, have invented certain new and useful Improvements in Preserved Food Products, of which the following is a specification.

This invention relates to preserved food products comprising compounds of formic acid, and relates in particular to certain basic compounds of formic acid with lime.

The commonly used preservatives for food, such for instance, as borax, benzoic acid, benzoate of soda, sulfate of copper, sulfur dioxid, formaldehyde, salicylic acid, and the like, have the great disadvantage that they interfere with the processes of digestion, and cause affections of the kidneys when used for a considerable period of time.

The object of the present invention is to provide a proper food containing an efficient preservative. I find that such a product is obtained through the combination of raw or cooked foods with a modicum of basic calcium formate. Formic acid combines with an excess of lime to form a basic compound of a somewhat alkaline nature, perhaps similar in its degree of alkalinity to lime water, and the like, and this basic formate is peculiarly adapted to the preservation of food. By combining it in an amount of one-twentieth to one-tenth of one per cent. in food stuffs, all danger of fermentation or putrefaction is avoided under ordinary conditions of keeping. For extreme service conditions, a larger amount may be incorporated with the food stuff with satisfying results. One-fifth of one per cent. may be used for preparations like milk, which are relatively unstable, and which must be preserved for a considerable period of time under conditions which ordinarily bring about rapid decomposition.

In preparing my improved composition, I dissolve oxid or carbonate of lime in formic acid until neutral, and then add a quantity of lime sufficient to render the compound basic in character. This is preferably done by boiling the neutral formate with an excess of hydrate of lime, subsequently filtering from undissolved lime, and evaporating the solution to dryness to obtain crystals of the basic formate of calcium. The food stuffs may then be prepared in any suitable manner, as by cooking or otherwise, and the basic formate of lime compound added in amount of say one-tenth of one per cent. The food may then, if desired, be placed in cans or jars and suitably sealed. The basic formate of lime may also be prepared by adding to a quantity of lime, as for instance, milk of lime, a quantity of formic acid sufficient to about half neutralize the lime, and boiling this solution until reaction is complete, when the formate compound may be extracted by filtration and evaporation. By using differing amounts of lime to any given amount of formic acid, compounds having different degrees of basicity may be secured. It is also possible in some cases to prepare the basic compound in the food stuff itself by adding thereto milk of lime and formic acid to make a formate of this character, and thereupon boiling the product or steaming it until incorporation is complete. In this manner such canned materials as tomatoes, beans, peas and other vegetables; pears, peaches and similar fruits; meats and other proteid and albuminous matter; egg albumen and dry egg material or egg powders and substitutes; milk, wines, beers and other beverages, as well as the flavoring syrups used therefor may be so treated that the flavor or aroma may be preserved for a long period of time, and eaten or drunk with impunity, as the composition has no deleterious action upon the health.

Magnesium may be made the base for this compound instead of lime, if desired, although the results are perhaps not as satisfactory under ordinary conditions of use. By the use of dolomitic lime mixed with magnesium and calcium, a formate may be obtained which has special properties adapting it to certain food stuffs.

The amount of lime employed in the neutralization of the formate may be reduced to a very low point under certain conditions, especially where a food stuff has naturally a slightly alkaline reaction, or where incipient decomposition has caused it to become feebly alkaline.

In the foregoing specification I have set forth in a specific way the nature of my invention, but I do not limit myself to the exact terms of said description, and may invoke the doctrine of chemical equivalence wherever the same may be herein applicable.

What I claim is:—

1. An edible material comprising a food stuff and a modicum of a water-soluble basic formate of an alkaline earth.

2. An edible material comprising a food stuff and a modicum of a basic formate of an alkaline earth.

3. An edible material comprising a food stuff and a modicum of a basic formate of calcium.

In testimony whereof I have affixed my signature in presence of two witnesses.

CARLETON ELLIS.

Witnesses:
NATHANIEL L. FOSTER,
HENRIETTA BERKWITZ.

---

Copies of this patent may be obtained for five cents each, by addressing the "Commissioner of Patents, Washington, D. C."